United States Patent [19]

Horn et al.

[11] Patent Number: 5,068,311

[45] Date of Patent: Nov. 26, 1991

[54] HIGH MOLECULAR WEIGHT (CO)POLYAMIDE FROM DIAMINO-ALCOHOL

[75] Inventors: Klaus Horn; Hans-Detlef Heinz, both of Krefeld; Peter-Rolf Müller, Leverkusen; Ralf Dujardin, Krefeld, all of Fed. Rep. of Germany

[73] Assignee: Bayer Aktiengesellschaft, Leverkusen, Fed. Rep. of Germany

[21] Appl. No.: 538,780

[22] Filed: Jun. 15, 1990

[30] Foreign Application Priority Data

Jun. 28, 1989 [DE] Fed. Rep. of Germany ....... 3921164

[51] Int. Cl.$^5$ .............................................. C08G 69/26
[52] U.S. Cl. .................................... 528/324; 528/315; 528/317; 528/318; 528/335; 528/336; 528/338; 528/480; 528/481
[58] Field of Search ............... 528/324, 338, 336, 335, 528/315, 317, 318, 480, 481

[56] References Cited

U.S. PATENT DOCUMENTS 4,341,671  7/1982  Bolze et al. ...................... 528/324

*Primary Examiner*—Harold D. Anderson
*Attorney, Agent, or Firm*—Connolly and Hutz

[57] ABSTRACT

The invention relates to high molecular weight thermoplastically deformable branched aliphatic polyamides prepared by polycondensation of lactams and/or polyamide-forming diamine/dicarboxylic acid reaction mixtures and/or amino acids in the presence of small amounts of specific diamino-alcohols and approximately equivalent amounts of polycarboxylic acids (preferably dicarboxylic acids), and to a process for their preparation, which is distinguished by considerably shortened polycondensation times, without cross-linked products being formed. If appropriate, the process additionally utilizes a solid phase after-condensation, in which rapid further condensation to products which are indeed branched but are soluble in m-cresol and have an increased melt viscosity takes place.

13 Claims, No Drawings

HIGH MOLECULAR WEIGHT (CO)POLYAMIDE FROM DIAMINO-ALCOHOL

The invention relates to high molecular weight thermoplastically deformable branched aliphatic polyamides prepared by polycondensation of lactams and/or polyamide-forming diamine/dicarboxylic acid reaction mixtures and/or amino acids in the presence of small amounts of specific diamino-alcohols and approximately equivalent amounts of polycarboxylic acids (preferably dicarboxylic acids), and to a process for their preparation, which is distinguished by considerably shortened polycondensation times, without cross-linked products being formed. If appropriate, the process additionally utilizes a solid phase after-condensation, in which rapid further condensation to products which are indeed branched but are soluble in m-cresol and have an increased melt viscosity takes place.

Polyamides are a class of polymers which has for many years proved itself for a large number of practical uses, it being possible for these polymers to be prepared by various processes, synthesized from very different polyamide-forming units and finished in the specific case of use by themselves or in combination with processing auxiliaries, polymeric blending partners or mineral reinforcing materials (such as e.g. fillers or glass fibres) to give materials of specifically adjusted combinations of properties. Polyamides are thus used industrially in large amounts for the production of fibres, mouldings of plastic and films, and also e.g. as melt adhesives and auxiliaries in a large numer of applications.

Whereas lactams can be converted cationically, hydrolytically (with added water) or anionically into polyamides, essentially only the polycondensation reaction is possible for polyamide preparation from polyamide-forming monomers, such as diamines, dicarboxylic acids or suitable derivatives and aminocarboxylic acids, also in combination with lactams (see Vieweg, Müller; Kunststoff-Handbuch (Plastics Handbook), Vol. VI, p. 11 et seq., Carl-Hanser Verlag, Munich 1966).

"Hydrolytic polymerization" is also of the greatest importance in the preparation of polyamides from lactams, e.g. of polyamide 6 from ε-caprolactam.

A large number of procedures have been disclosed for the preparation of polyamides, different monomer units for determination of the matrix nature, different chain regulators for establishing a desired average molecular weight or also monomers with "reactive" groups for after-treatments intended later (e.g. amino groups or sulphonate groups for better dyeing of fibres with acid or basic dyestuffs) being employed, depending on the desired end product.

Continuous preparation processes are likewise known, such as discontinuous production, e.g. in an autoclave.

All the methods for the preparation of (co)polyamides by polycondensation or by hydrolytic polymerization of lactams and/or polyamide-forming diamine/dicarboxylic acid reaction mixtures have the common feature, however, that starting from suitable monomer mixtures, the preparation of the (co)polyamides usually takes a reaction time of many hours, until the polyamides have reached a sufficiently high molecular weight for spinning of strands from the polymer melt, or the molecular weights are sufficiently high for the intended use in practice.

Regardless of the long reaction time, in many cases after-condensation—e.g. in the solid phase—is still necessary in order to achieve even higher molecular weights. This necessarily means—because of the relatively slow rate of reaction—relatively long after-condensation times at relatively high temperatures, which often have a damaging effect (colour, oxidation, gel particle formation).

The long reaction times required for the preparation of (co)polyamides thus seriously limit the capacity of the production plants and in particular are highly energy-consuming and expensive, since the reaction must be carried out at temperatures above 200° C., usually above 250° C., and always above the melting point of the product to be prepared. A considerable shortening of the reaction times in the preparation of (co)polyamides—without dispensing with the known good technological properties of the products —would therefore be regarded as a major, particularly cost- and energy-saving advance.

Surprisingly, it has now been found that the polycondensation time for the preparation of (co)polyamides from lactams and/or polyamide-forming diamine/dicarboxylic acid reaction mixtures and/or amino acids can be drastically shortened if small amounts of specific diamino-alcohols and approximately equivalent amounts of a polycarboxylic acid, preferably a dicarboxylic acid, are added to the polyamide-forming starting monomers. The equivalence here is calculated with respect to the amine contents.

Although the preparation of polycaproylamide in the presence of ethoxylated ethylenediamine is described in the literature (Radka Garvanska, Rumjana Lasarova and Kiril Diov, Angew. Makrom. Chemie 122 (1984), p. 183-191), the ethoxylated diamine was employed, however, in amounts of 1 to 8 wt. % and without an equivalent amount of polycarboxylic acid, in order to reduce the specific resistance in comparison with non-modified polyamide. After a polycondensation time of 8 hours, the polyamide thus obtained has a lower relative viscosity than non-modified polyamide.

It is therefore completely unexpected that in catalytic amounts of less than 1 wt. % as a mixture with equivalent amounts of polycarboxylic acids, preferably dicarboxylic acids, diamino-alcohols accelerate the polyamide formation and even lead to polyamides of higher relative viscosity and melt viscosity, the products being soluble in m-cresol.

Regardless of the actual preparation of the polyamides, however, a further increase in the molecular weight is required for many applications which require even higher molecular weight products, e.g. extrusion to films or semi-finished products. This can be effected only poorly in the polycondensation plants usually employed, e.g. autoclaves in discontinuous production or VK pipes in the case of continuous production, since the markedly increasing melt viscosity leads to various problems. The temperature control and the removal of the water of reaction thus become more and more difficult, and the long reaction time at the temperatures needed increasingly leads to side reactions and gel particle formation, which can drastically impair the quality of the end product. Spinning also becomes increasingly more difficult at very high melt viscosities.

Solid phase after-condensation offers decisive advantages here. Because of the far lower reaction temperatures (about 160° to 200° C., depending on the polyamide, in comparison with 250° to 280° C. in melt condensation), the risk of undesirable side reactions and gelling is reduced; the fact that the material to be subjected to after-condensation is in the form of defined particles with an existing inter-particle volume, together with the variant of continuously agitating the granules, e.g. in tumble driers, facilitates maintenance of a uniform reaction temperature and removal of the water of reaction. Since the material is in particle form, there are also no spinning problems.

Although the solid phase after-condensation process is employed on a large scale industrially for the preparation of higher molecular weight polyamides, this process nevertheless also involves a number of disadvantages, the cause of which lies in the relatively low rate of the after-condensation. The customary after-condensation process thus still requires a high expenditure on time and energy. Because of the considerable residence time at the reaction temperature, the process is also highly plant-intensive.

Surprisingly, it has furthermore been found that the polyamides according to the invention which are modified with specific diamino-alcohols/polycarboxylic acids can be rapidly after-condensed in the solid phase to give high molecular weight products. In spite of the fact that the actual melt polycondensation is accelerated by diamino-alcohols, this effect is unexpected and was not to be foreseen, since it is known that melt polycondensation and solid phase after-condensation follow quite different laws and mechanisms (see e.g. R. J. Gaymans, J. Amirtharaj, H. Kamp, J. Appl. Polym. Sci. 27, 2513-2526 (1984); L. B. Sokolov, Solid Phase Polymerization, Syntheses by Polycondensation, Pbl. Israel Programm for Scientific Translation 1968).

It has furthermore been found that high molecular weight, probably somewhat branched (co)polyamides having a significantly increased melt viscosity in comparison with (co)polyamides which are free from diamino-alcohols are obtained if a solid phase after-condensation is carried out with a considerably shortened reaction time and/or at relatively low temperatures.

The invention therefore relates to a process for the preparation of high molecular weight, m-cresol soluble (co)polyamides based on lactams and/or polyamide forming diamine/dicarboxylic acid reaction mixtures and/or amino acids, with the addition of diamino-alcohols, under melt condensation conditions and if appropriate with solid phase after-condensation, characterized in that a) 0.005 to 0.99 wt. %, preferably 0.01 to 0.95 wt. % and particularly preferably 0.02 to 0.5 wt. %, of one or more diamino-alcohols of the general formula (I)

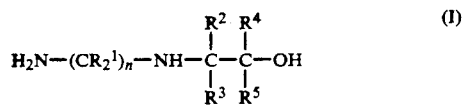

wherein
$R^1$, $R^2$, $R^3$, $R^4$ and $R^5$ independently of one another denote hydrogen or $C_1$-$C_{12}$-alkyl (if alkyl, preferably methyl), and particularly preferably hydrogen, and two radicals $R^1$ and/or $R^3$ and/or $R^5$ on the same or adjacent carbon atoms can also be members of a ring containing 5 to 12 carbon atoms, and
n is a natural number from 2 to 22, preferably 2, and b) amounts of at least one polycarboxylic acid, preferably a dicarboxylic acid, which are approximately equivalent to the amino groups of (I)
are added to the polyamide-forming mixture to be polymerized, and the polycondensation is carried out in the usual manner. The invention also relates to high molecular weight (co)polyamides based on lactams and/or polyamide-forming diamine/dicarboxylic acid reaction mixtures and/or amino acids, characterized in that they contain, as cocondensed units, a) 0.005 to 0.99 wt. % units derived from diamino-alcohols of the general formula (I)

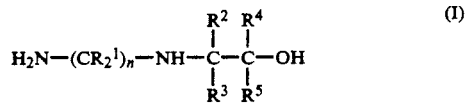

wherein
$R^1$, $R^2$, $R^3$, $R^4$ and $R^5$ independently of one another denote hydrogen or $C_1$-$C_{12}$-alkyl (if alkyl, preferably methyl), and particularly preferably hydrogen, and two radicals $R^1$ and/or $R^3$ and/or $R^5$ on the same or adjacent carbon atoms can also be members of a ring containing 5 to 12 C atoms, and
n is a natural number from 2 to 22, preferably 2, and b) amounts of at least one polycarboxylic acid, preferably a dicarboxylic acid, which are approximately equivalent to the amino groups of I.

The invention furthermore relates to the use of these high molecular weight (co)polyamides for the production of shaped articles, e.g. by injection moulding for the production of shaped articles, films, fibres and other articles.

Suitable lactams in the sense of the invention are lactams having 5 to 13 ring members, preferably 5 to 12 methylene groups in the lactam ring, such as e.g. caprolactam, oenantholactam, capryllactam and lauroyllactam, by themselves or as a mixture; $\epsilon$-caprolactam and lauroyllactam are preferably employed. $\epsilon$-Caprolactam is especially preferably used.

Suitable polyamide-forming aliphatic dicarboxylic acids are dicarboxylic acids having 6 to 40 C atoms, preferably having 6 to 12 and 36-38 C atoms. Examples are adipic acid, pimelic acid, trimethyladipic acid, octanedioc acid, azelaic acid, sebacic acid, dodecanedioc acid, heptadecanedicarboxylic acids (1,8-and 1,9-mixture) and dimeric fatty acids ($C_{36}$, hydrogenated and non-hydrogenated); adipic acid, azelaic acid, sebacic acid, dodecanoic acid and dimeric fatty acids are preferred. Proportions of aromatic dicarboxylic acids, such as isophthalic acid or terephthalic acid, can also be co-used.

Examples of aliphatic diamines are those having 4 to 12 C atoms, such as e.g. 1,4-diaminobutane, hexamethylenediamine, octamethylenediamine, trimethylhexamethylenediamines, decamethylenediamine and isophoronediemaine, preferably hexamethylenediamine and trimethylhexamethylenediamines.

In addition to the dicarboxylic acids and diamines mentioned, dicarboxylic acids and diamines in which the alkylene chains contain oxygen atoms are also suitable, thus e.g. 1,8-diamino-3,6-dioxaoctane, 1,11-diamino-3,6,9-trioxaundecane and 3,6-dioxa-heptanoic acid. Examples of amino acids are those having at least 5 C atoms between the amino and carboxyl function, preferably 6-aminohexanoic acid, 11-aminoundecanoic acid and 12-aminododecanoic acid.

The diamine/dicarboxylic acid mixtures can optionally contain each component in itself or preferably, as is generally known, for reasons of reliable stoichiometry, be employed as previously prepared dicarboxylic acid diamine salts (e.g. AH salt of adipic acid and hexamethylenediamine). These salts can be used as solids or as solutions, e.g. in water. It is possible to co-use the customary chain stoppers, e.g. monofunctional carboxylic acids or amines, e.g. acetic acid, hexanoic acid, benzoic acid, cyclohexanecarboxylic acid, stearic acid, hexylamine or cyclohexylamine, in the customary amounts.

Examples of the diamino-alcohols to be used according to the invention are: N-(2-hydroxyethyl)-ethylenediamine, N-(2-hydroxyethyl)-propane-1,3-diamine, N-(2-hydroxyethyl)-butane-1,4-diamine, N-(2-hydroxyethyl)-pentane-1,5-diamine, N-(2-hydroxyethyl)-hexane-1,6-diamine, N-(2-hydroxyethyl)-octane-1,8-diamine, N-(2-hydroxyethyl)-decane-1,10-diamine and N-(2-hydroxyethyl)-dodecane-1,12-diamine. N-(2-hydroxyethyl)ethylenediamine is particularly preferably used.

The compounds are known (e.g. Beilstein 4, IV,2449) or can be prepared by known processes.

Suitable polycarboxylic acids for combination with the diamino-alcohols are preferably aliphatic dicarboxylic acids having 6 to 12 C atoms or aromatic dicarboxylic acids having 8 to 18 C atoms, thus e.g. adipic acid, trimethyladipic acid, suberic acid, azelaic acid, sebacic acid, dodecanedioc acid, isophthalic acid, hexahydroterephthalic acid and terephthalic acid. Adipic acid, sebacic acid, azelaic acid and isophthalic acid are particularly preferably employed.

Monocarboxylic acids, such as acetic acid or benzoic acid others, can be employed in the customary amounts.

For acceleration of the polycondensation, 0.005 to 0.99 wt. %, preferably 0.01 to 0.95 wt. % and particularly preferably 0.02 to 0.5 wt. %, of one or more of the diamino-alcohols and approximately the equivalent amount of polycarboxylic acid, preferably a dicarboxylic acid, are to be employed according to the invention. The diamino-alcohols and the polycarboxylic acids can be added separately or together, if appropriate in aqueous solution. It is advantageous to add the diamino-alcohols and the polycarboxylic acids before the start or during the first stages of the reaction.

In addition to the polyamide-forming components, the diamino alcohols and the polycarboxylic acids the reaction mixture may, if desired, contain further polyamide catalysts or -accelerators, such as e.g. described in the German OS 383 707, 9.

Whereas equivalent amounts of carboxylic acid groups (based on the amino groups of the diamino-alcohol component) are preferred, approximately equivalent amounts, e.g. 0.75 to 1.10 equivalents, preferably 0.85 to 1.03 equivalents, in particular 0.90 to 1.00 equivalent, of carboxylic acid groups can also be used.

According to the invention, it is possible, if appropriate, for the polycondensation to be carried out —either discontinuously or in a continuous form, e.g. in tube reactors or single- or twin-screw extruders, —with downstream after-condensation vessels or reactors. According to the invention, the polycondensation time (depending on the particular polycondensation temperature) can for example be reduced to half the usual polycondensation time, e.g. in order to obtain polyamides of the desired melt viscosity.

In comparison with known comparison products, the polyamides according to the invention have characteristically higher melt viscosities with a comparable solution viscosity ($\eta_{rel}$ 1% in m-cresol at 25° C.), exhibit a pronounced structural viscosity and therefore probably are of a different (branched?) structure.

The polyamides prepared according to the invention can be discharged from the melt in a known manner, preferably into a water bath, chopped, optionally extracted and dried.

Shaped articles, fibres and films can likewise be produced from the polyamides in a known manner by thermoplastic processing.

If appropriate, the diamino-alcohol-modified (co)-polyamides thus obtained can be subjected to after-condensation in the solid phase in order to increase the molecular weight further, during which in general also a significant increase in the melt viscosity occurs and this after-condensation is accelerated. Surprisingly, however, the products remain soluble in m-cresol.

Any desired diamino-alcohol-modified (co)polyamides, as claimed, can be employed for the preparation of these high molecular weight branched but still m-cresol-soluble (co)polyamides by solid phase after-condensation; polyamides based on polyamide 6 and polyamide 66 are particularly suitable.

The reaction time in the solid phase until a given (desired) melt viscosity is reached is reduced in comparison with polyamides which are not modified with diamino-alcohol.

Suitable reaction temperatures for the after-condensation are in the range from 140° to 240° C., preferably 150° to 210° C. The reaction should in any case be carried out at not less than 10° C., preferably not less than 20° C., below the melting point of the particular polyamide. The condensation time can be chosen between a few minutes and about 30 hours, preferably between 0.5 and 25 hours. It is, in particular, 5 to 20 hours. The longer reaction times are to be used here in particular at the lower after-condensation temperatures, and the shorter reaction times preferably correspond to the higher after-condensation temperatures.

All the devices usually employed for a solid phase after-condensation are suitable for the preparation of the polyamides according to the invention. Drum driers and spiral mixers are preferably employed with a discontinuous procedure. Continuous solid phase after-condensation processes are also suitable for the preparation of the polyamides according to the invention.

In comparison with known comparison products, the high molecular weight branched polyamides have characteristically higher melt viscosity values with a similar solution viscosity $\eta_{rel}$ 1% in m-cresol at 25° C.) and exhibit a certain structural viscosity. The high molecular weight, evidently branched polyamides are suitable for all uses of high molecular weight polyamides.

The process according to the invention can also be used for the production of polyamide-masterbatches, preferably as mentioned in the European application 360 060-A1. The invention also relates to these concentrates.

The polyamides can contain customary additives, e.g. dulling agents, such as titanium dioxide, admixed already during the preparation process of later. Examples of the usual additives are processing auxiliaries (e.g. lubricants and mould release agents), stabilizers of all types, fillers and reinforcing substances, dyestuffs and pigments, furthermore the known impact modifier additives for polyamides, moisture-up-take reducing additives (especially bisphenols and novolaks) and others, as described in the state of the art.

The following examples serve to illustrate the invention without limiting it thereto in any way. The melt viscosities were measured with a Contraves RM 300 plate-ball viscometer at the temperatures stated.

EXAMPLE 1

10 kg ε-caprolactam, 10 g N-(2-hydroxyethyl)-ethylenediamine (corresponds to 0.1 wt. %, based on the amount of ε-caprolactam), 14 g adipic acid and 1 l distilled water are weighed into a 25 l pressure autoclave. A nitrogen atmosphere is achieved in the autoclave by forcing in 3 bar nitrogen and then letting down three times. The mixture is heated rapidly (about 90 min) to 200° C. and stirred under its autogenous pressure at 200° C. for 1 hour. It is then let down to normal pressure in the course of about 2 hours and rapidly heated up to 270° C., and the polycondensation is then carried out at 270° C. for 2½ hours, 40 l $N_2$/h being passed over. The mixture is allowed to settle and the polyamide is forced with increased pressure through the bottom valve as a strand into a water bath. After granulation and extraction with distilled water, 8.2 kg polyamide 6 with a relative viscosity (1% solution in m-cresol at 25° C.) of 3.6 are obtained. The product has a melt viscosity of 500 Pas at 270° C. and 1.25 $s^{-1}$.

EXAMPLE 2

A polyamide is prepared from 10.0 kg ε-caprolactam, 5.0 g (0.05 wt. %, based on the ε-caprolactam) N-(2-hydroxyethyl)-ethylenediamine, 7.0 g adipic acid and 1 l $H_2O$ analogously to example 1. The polycondensation time is 2¼ hours. 9.3 kg polyamide 6 with a relative viscosity (1% solution, m-cresol, 25° C.) of 3.9 are obtained. The product has a melt viscosity of 800 Pas at 270° C. and 1.25 $s^{-1}$.

COMPARISON EXPERIMENT 1

A polyamide is prepared analogously to example 1 without the additions of N-(2-hydroxyethyl)-ethylenediamine and adipic acid. However, the polycondensation is carried out at 270° C. for 6 hours, and a polyamide with $\eta_{rel}=3.0$ is now nevertheless obtained. The product has a melt viscosity of 200 Pas at 270° C. and 1.25 $s^{-1}$.

EXAMPLE 3

90 g ε-caprolactam, 10 g aminocaproic acid, 0.1 g N-(2-hydroxyethyl)-ethylenediamine and 0.14 g adipic acid are weighted into a 250 ml round-bottomed flask. After evacuating and letting down twice with nitrogen, the mixture is heated up to 200° C. in the course of 15 min, while stirring, and kept at 200° C. for 1 hour. It is then heated up to 270° C. in the course of 10 min and the polycondensation is carried out for 3.5 hours. The granulate is extracted with distilled water. The polyamide has a relative viscosity of 3.6. The melt viscosity at 250° C. is 1,2000 Pa.s at a shearing force of 1.2 $s^{-1}$.

COMPARISON EXPERIMENT 2

Example 3 is repeated with the difference that no N-(2-hydroxyethyl)-ethylenediamine and no adipic acid are added. The polycondensation time is 6 hours. A polyamide 6 with a relative viscosity of 3.5 and a melt viscosity at 250° C. of 440 Pa.s at a shearing force of 1.2 $s^{-1}$ is obtained.

COMPARISON EXPERIMENT 3

Example 3 is repeated with the difference that no adipic acid is added. After a condensation time of 6 hours at 270° C., a polyamide 6 with a relative viscosity of 4.0 is obtained. The product does not look completely homogeneous (gel contents).

COMPARISON EXPERIMENT 4

A polyamide 6 with $\eta_{rel}=4.1$ is obtained after 6 hours under the conditions of comparison experiment 3 without N-(2-hydroxyethyl)-ethylenediamine and without adipic acid.

EXAMPLE 4

71.6 wt. % sebacic acid, 41.1 g hexamethylenediamine, 0.2 g N(2-hydroxyethyl)-ethylenediamine and 0.27 g adipic acid were introduced into a 250 ml round-bottomed flask. After evacuating and letting down with nitrogen twice, the mixture was heated up to 200° C. in the course of about 15 min and subjected to precondensation at 200° C. for one hour. It was then heated up to about 280° C. in the course of about 15 min, while stirring, and stirred at about 280° C. for 2.5 hours. A polyamide with a relative viscosity ($\eta_{rel}$, 1% in m-cresol at 25° C.) of 4.1 is obtained. The melt viscosity of the polyamide at 270° C. and 0.9 $s^{-1}$ is 5,400 Pas.

COMPARISON EXPERIMENT 5

Example 5 was repeated, but without the addition of N-(2-hydroxyethyl)-ethylenediamine and adipic acid. After 2.5 hours a polyamide with a relative viscosity of 3.5 was obtained. The melt viscosity, measured at 270° C. and 0.9 $s^{-1}$ is 1,000 Pas.

EXAMPLES 5 TO 9

In each case about 100 g PA 6 granulates modified with N-(2-hydroxyethyl)-ethylenediamine (prepared as described in Example 1) were subjected to after condensation on a rotary evaporator in a stream of $N_2$ for various periods of time (t). The conditions were: 50 rpm, 170° C., 40 l $N_2$ $h^{-1}$.

The $\eta_{rel}$ values and the melt viscosities (MV) at a temperature of 270° C. are listed in table 1.

COMPARISON EXPERIMENT 6

A linear typical PA 6 ($\eta_{rel}=3.7$), the melt viscosity of which approximately corresponded to that of the granulate used in examples 5 to 9, was subjected to after-condensation in the manner described above for 14 hours. Only a very slight increase in molecular weight occured ($\eta_{rel}=3.9$). The melt viscosity was also practically unchanged after the after-condensation.

TABLE 1

| Example | t at 170° C. (in hours) | η rel | MV (270° C.; 1.2 $s^{-1}$) |
|---|---|---|---|
| 5 | 0 | 3.6 | 500 Pas |
| 6 | 3 | 4.1 | 1,070 Pas |
| 7 | 7 | 4.1 | 2,100 Pas |
| 8 | 10 | 4.2 | not determined |
| 9 | 14 | 4.4 | 2490 Pas |

It is claimed:
1. Process for the preparation of high molecular weight, m-cresol-soluble (co)polyamides comprising melt condensing 1) at least one lactam or 2) a polyamide-forming diamine/dicarboxylic acid reaction mixture or a mixture of 1) and 2) with a) 0.005 to 0.99 wt. % of one or more diamino-alcohols of the general formula (I)

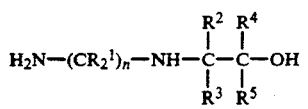

wherein
$R^1$, $R^2$, $R^3$, $R^4$ and $R^5$ independently of one another denote hydrogen, or $C_1$–$C_{12}$-alkyl, or two radicals, $R^1$, $R^3$ or $R^5$ on the same or adjacent carbon atoms are members of a ring containing 5 to 12 carbon atoms, and b) amounts of at least one polycarboxylic acid which are approximately equivalent to the amino groups of (I).

2. Process according to claim 1, wherein 0.01 to 0.95 wt. % diamino-alcohols (I) are melt condensed.

3. Process according to claim 1, characterized in that $R^1$, $R^2$, $R^3$, $R^4$ and $R^5$ in the diaminoalcohols (I) denote hydrogen or methyl groups.

4. Process according to claim 1, characterized in that N-(2-hydroxyethyl)-ethylenediamine is the diaminoalcohol (I).

5. Process according to claim 1, characterized in that the diaminoalcohols (I) and the polycarboxylic acids in approximately the equivalent amount are added to the polyamide-forming reaction mixture before or at the start of the reaction.

6. Process according to claim 1, characterized in that 0.02 to 0.5 wt. % diamino-alcohol (I) are added.

7. Process according to claim 1, characterized in that dicarboxylic acids are added as the polycarboxylic acids (b).

8. High molecular weight branched m-cresol-soluble (co)polyamide based on lactams, polyamide-forming diamine/dicarboxylic acid reaction mixtures, or amino acids, characterized in that they contain, as cocondensed units, a) 0.005 to 0.99 wt. % units derived from diamino-alcohols of the general formula (I)

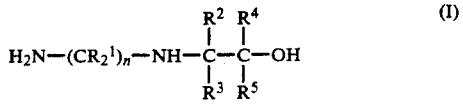

wherein
$R^1$, $R^2$, $R^3$, $R^4$ and $R^5$ independently on one another denote hydrogen or $C_1$–$C_{12}$-alkyl, or two radicals of $R^1$, $R^3$, or $R^5$, on the same or adjacent carbon atoms are members of a ring containing 5 to 12 C atoms, and n is a natural number from 2 to 22 and b) amounts of at least one polycarboxylic acid which are approximately equivalent to the amino groups of I.

9. High molecular weight (co)polyamide according to claim 8 wherein $R^1$, $R^2$, $R^3$, $R^4$ and $R^5$ denote hydrogen.

10. High molecular weight (co)polyamide according to claim 8 wherein n is 2.

11. High molecular weight (co)polyamide according to claim 8 wherein the polycarboxylic acid b) is a dicarboxylic acid.

12. Shaped article of the high molecular weight (co)polyamide according to claim 8.

13. Process for the preparation of high molecular weight, m-cresol-soluble (co)polyamide comprising melt condensing 1) at least one lactam or 2) a polyamide-forming diamine/dicarboxylic acid reaction mixture, or a mixture of 1) and 2) with a) 0.005 to 0.99 wt. % of one or more diamino-alcohols of the general formula (I)

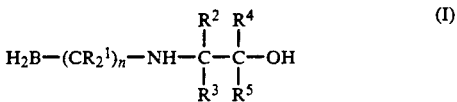

wherein
$R^1$, $R^2$, $R^3$, $R^4$ and $R^5$ independently of one another denote hydrogen, or $C_1$–$C_{12}$-alkyl, or two radicals of $R^1$, $R^3$ or $R^5$, on the same or adjacent carbon atoms are members of a ring containing 5 to 12 carbon atoms, and b) amounts of at least one polycarboxylic acid which are approximately equivalent to the amino groups of (I), and thereafter subjecting the high molecular weight (co)polyamide to a solid phase aftercondensation at 140° to 240° C., but not less than 10° C. below the melting point of the (co)polyamide, over a reaction time in the range from 0.5 to 30 hours.

* * * * *